United States Patent
Khanka et al.

(10) Patent No.: US 8,169,907 B1
(45) Date of Patent: May 1, 2012

(54) METHOD AND SYSTEM FOR DELIVERING A MULTI-USER PACKET

(75) Inventors: Bhagwan Singh Khanka, Lenexa, KS (US); Anoop Kumar Goyal, Overland Park, KS (US); Shilpa Kowdley Srinivas, Herndon, VA (US); Hemanth Balaji Pawar, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 366 days.

(21) Appl. No.: 12/186,941

(22) Filed: Aug. 6, 2008

(51) Int. Cl.
*H04L 12/26* (2006.01)
(52) U.S. Cl. .................................. 370/232; 370/432
(58) Field of Classification Search .................. 370/232, 370/235, 236, 236.1, 236.2, 252, 253, 312, 370/432
See application file for complete search history.

(56) References Cited

U.S. PATENT DOCUMENTS

| | | | |
|---|---|---|---|
| 2004/0092288 A1* | 5/2004 | Moon et al. ................. | 455/560 |
| 2005/0232293 A1* | 10/2005 | Pelt et al. .................... | 370/432 |
| 2006/0176881 A1* | 8/2006 | Ma et al. ..................... | 370/392 |
| 2006/0264218 A1* | 11/2006 | Zhang et al. ................ | 455/450 |
| 2007/0168555 A1* | 7/2007 | Dorenbosch ................ | 709/245 |
| 2008/0273458 A1* | 11/2008 | Guo et al. ................... | 370/229 |
| 2009/0080361 A1* | 3/2009 | Song et al. .................. | 370/312 |

* cited by examiner

*Primary Examiner* — Gary Mui

(57) ABSTRACT

A method, system, and computer readable media are provided for transmitting multi-user packets in an evolution data only (EVDO) network. Upon receipt of the data rate control requests of access terminals in the network, an access node can group particular access terminals into groups of shared data rate control access terminals. The access node will generate and later send a multi-user packet based on the requested data rate control of a group of shared data rate control access terminals. The transmission of the multi-user packet shall be accomplished at the requested data rate control of the group of shared data rate control access terminals.

15 Claims, 4 Drawing Sheets

METHOD AND SYSTEM FOR DELIVERING A MULTI-USER PACKET

BACKGROUND

Traditionally, multi-user packets (MUPs) are sent with the lowest data rate control (DRC) across all of the MUP access terminals (ATs). This implementation is inefficient for access terminals that are capable of receiving data at a higher rate.

SUMMARY

Embodiments of the invention are defined by the claims below, not this summary. A high-level overview of embodiments of the invention are provided here for that reason, to provide an overview of the disclosure.

In a first embodiment, a method is provided for delivering a multi-user packet in an Evolution Data Only (EVDO) system. Data rate control requests are obtained from a plurality of access terminals. A group of shared data right control access terminals are identified from the plurality of access terminals, based on the data rate control request. A Multi-User Packet (MUP) is generated for the group of share data rate control access terminals, and is then transmitted to the group of shared data rate control access terminals at a compatible rate.

In a second embodiment, computer readable media for performing a method of sending a multi-user packet to share data rate control access terminals is disclosed. Data rate control requests are received from a plurality of single access terminals in an EVDO system. At least a portion of the plurality of access single terminals are grouped into at least one group of shared data rate control access terminals, based on the data rate control request. At least one multi-user packet is assembled for the at least one group of shared data rate control access terminals. The at least one multi-user packet is then transmitted to the at least one group of shared data rate control access terminals. The at least one multi-user packet is sent at a corresponding data rate requested by the at least one group of shared data rate control access terminals.

In a third embodiment, a system for transmitting multi-user packets over an EVDO network is provided. The system includes a plurality of access terminals, and access node coupled to the plurality of the access terminals, and one or more computer readable media coupled to the access node for performing a method of sending the multi-user packet to shared data rate control access terminals. Data rate control requests are received from the plurality of access terminals. A plurality of shared data rate control terminals are established from the plurality of access terminals. A multi-user packet for each of the shared data rate control access terminal is generated based on the corresponding data rate control request of the plurality of the data rate control access terminals. The multi-user packet is transmitted to the plurality of shared data rate control access terminals. The multi-user packet is transmitted at a corresponding data rate requested by the plurality of shared data rate control access terminals.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
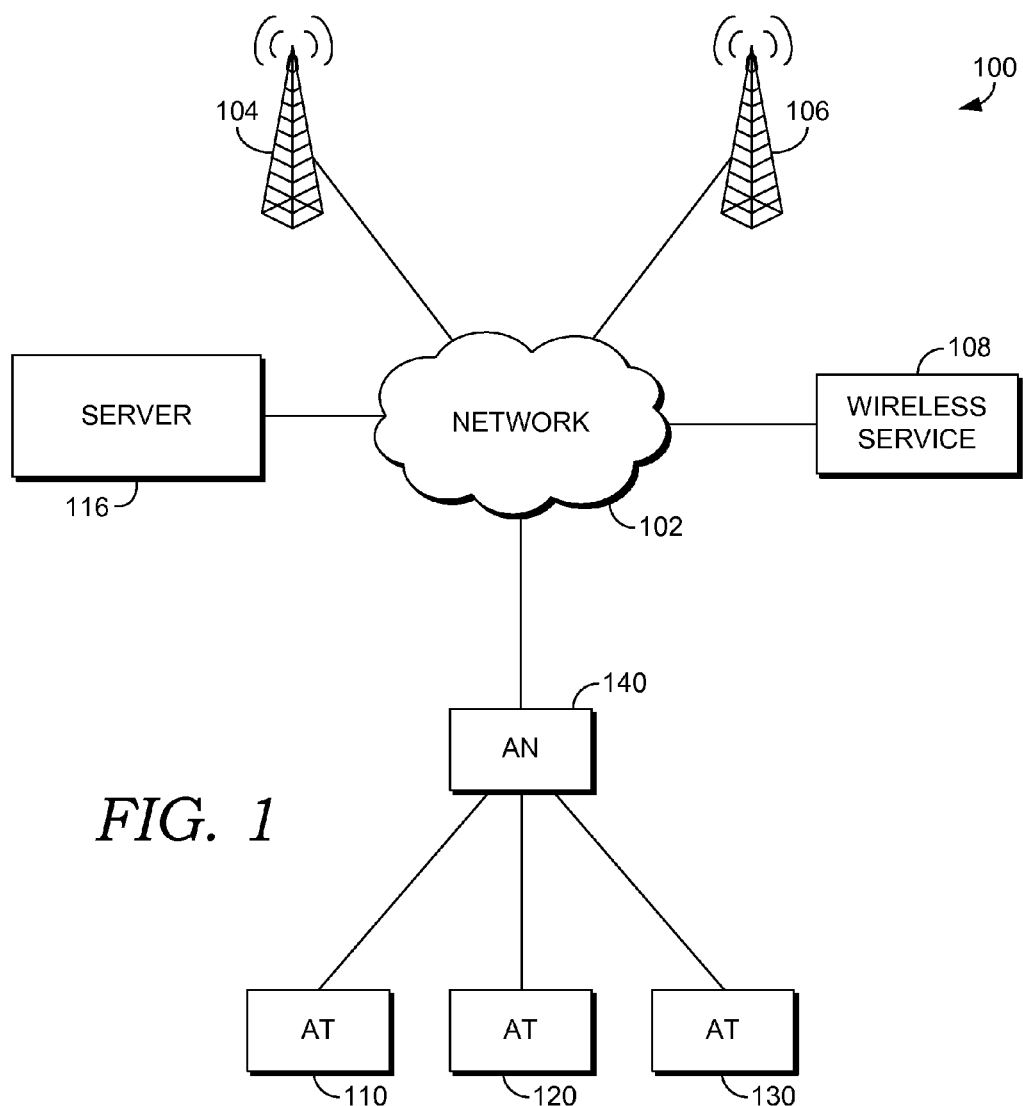
FIG. 1 depicts a system for transmitting a multi-user packet over an EVDO network in accordance with the embodiment of the invention.

Embodiments of the invention provide systems, methods, and media for sending multi-user packets in an evolution data only (EVDO). With existing EVDO systems, certain packets are transmitted at a lower rate than what an access terminal can receive. This by itself results in inefficiency of packet receipt and transmission. In other words, packets that are being sent through an EVDO system are traditionally sent at a lower rate than what an access terminal can stand, because the identification of the corresponding data rate control is either neglected or not utilized to its full advantage. Embodiments of this invention allow for the delivery of multi-user packets in such a way so as to ensure that access terminals can receive at the highest possible data rate without losing data or causing any packet loss within the network.

Throughout the description of embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the invention. The following is a list of these acronyms:

| | |
|---|---|
| AN | Access Node |
| AT | Access Terminal |
| DRC | Data Rate Control |
| EVDO | Evolution Data Only |
| MUP | Multi-User Packet |

Further, various technical terms are used throughout this description. An illustrative resource that fleshes out various aspects of these terms can be found in *Newton's Telecom Dictionary* by H. Newton, 24$^{th}$ Edition (2008).

Embodiments of the invention may be embodied as, among other things: a method, system, or computer-program product. Accordingly, the embodiments may take the form of a hardware embodiment, a software embodiment, or an embodiment combining software and hardware. In one embodiment, the invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. The computer readable media are non-transitory in nature and store computer-useable instructions. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

In FIG. 1, EVDO system 100 is shown. The EVDO system 100 includes a plurality of access terminals—110, 120, and 130—as well as an access node 140. One skill in the art will recognize that this is not the entire system for an existing EVDO system, but with regards to embodiments of this invention, these particular components are noteworthy. Each of the access terminals—110, 120, and 130—are coupled or configured to communicate with the access node 140. Computer readable media which will be discussed later on, can be found anywhere in the system 100. For instance, the computer readable media for which the methods are described later herein can be found in the access node 140, or any other portion of an EVDO system 100. One skill in the art will recognize that the EVDO system 100 is not limited to three access terminals. Rather FIG. 1 is exemplary insofar as any number of access terminals and any number of access nodes and any other components can be utilized within the EVDO system and still utilize the embodiments of this invention.

Still referring to FIG. 1, the system 100 may include media that groups at least a portion of the plurality of access terminals into at least one plurality of shared data rate control access terminals up to a particular threshold. The threshold may be time-based, number-based, and load-based. In other words, the group may be established upon a certain number for bandwidth allocation or for access terminals being grouped within the one group of shared data rate control access terminals.

The multi-user packet can be transmitted to the at least one group of shared data rate control access terminals, when the threshold of at least one group is reached. The transmission is one of simultaneous and near-simultaneous. The access node 140 is configured to track at least one group of shared data rate control access terminals. The multi-user packet is transmitted to the at least one group of shared data rate control access terminals. The access node 140 is also configured to track the multi-user packet that is transmitted to at least one group of shared data rate control access terminals, as well as the data rate that is utilized by the access node 140 to transmit said multi-user packet.

A delivery algorithm executed on the system by the computer readable media occurs whenever data rate control requests are received and a sub-frame is transmitted over the EVDO network.

Figure 2:
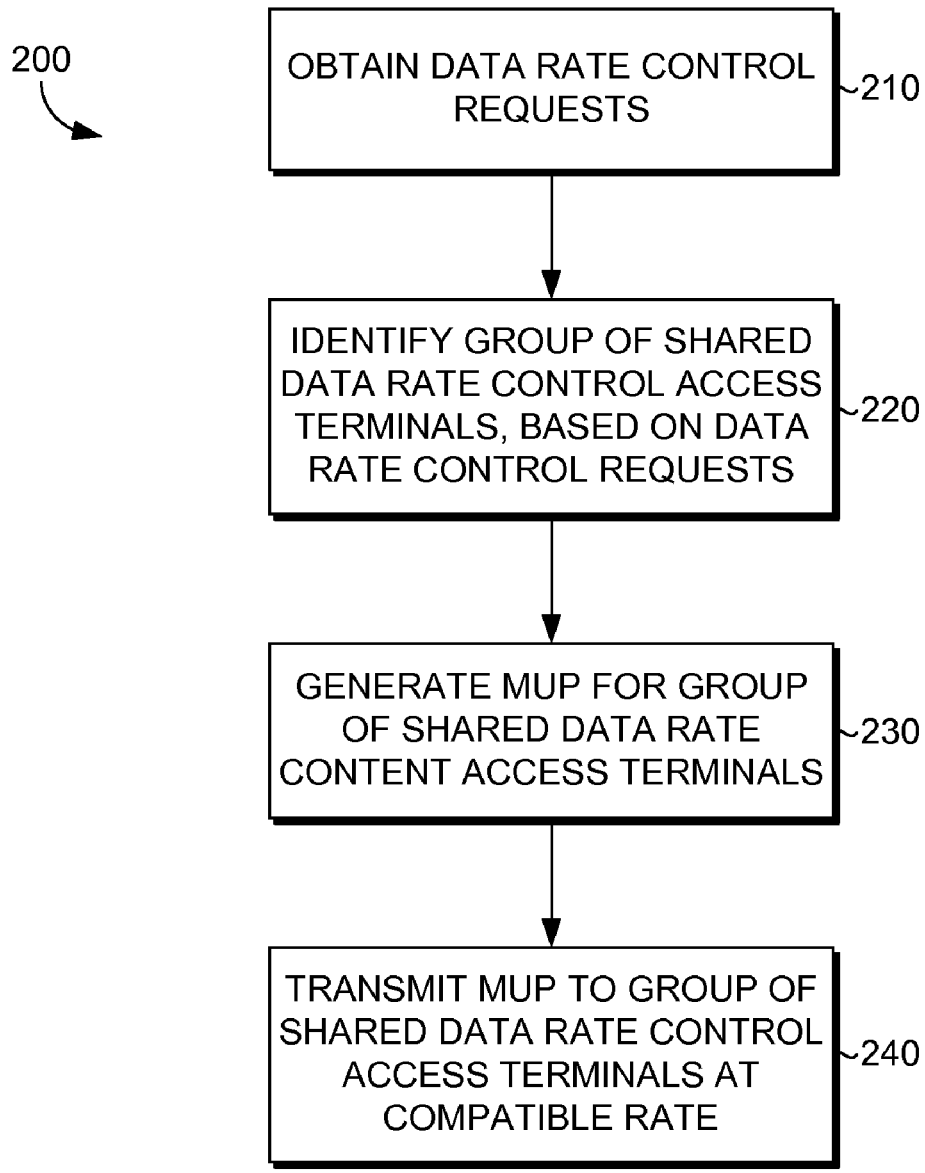
FIG. 2 is flow-diagram for a method for delivering a multi-user packet in an EVDO system in accordance with the embodiment of the invention.

As shown in FIG. 2, a method 200 is shown for delivering a multi-user packet in an EVDO system. At a step 210, data rate control requests are obtained from a plurality of access terminals. At a step 220, a group of shared data rate control access terminals is identified from the plurality of access terminals, based on the data rate control request. At a step 230, a multi-user packet is generated for the group of shared data rate control access terminals. The multi-user packet is transmitted at a step 240 to the group of shared data rate control access terminals at a compatible rate.

The transmission of the multi-user packet to the group of shared data access terminals at a compatible rate is accomplished at a highest shared data rate control available. Furthermore, the method 200 can include identifying a singular data rate control access terminal and transmitting a single user packet to the singular data rate control access terminal. In other words, embodiments of this invention allow for both multi-user packets and single user packets to be sent over the EVDO system.

The multi-user packet is transmitted to the group of shared data rate control access terminals prior to transmitting the single user packet to the singular data rate access terminal. One skilled in the art can appreciate that multi-user packets can be sent at any time in relation with single user packets, and for that matter, multi-user packets can be sent in a staggered manner along with single user packets. However, since embodiments of this invention are geared towards the highest efficiency data rate control for access terminals, multi-user packets can be sent initially before single user packets are sent.

The multi-user packet is transmitted to the group of shared data rate control access terminals at a compatible rate simultaneously. The transmission occurs when a threshold number of shared data rate control access terminals within the group is reached. Such a threshold number is configurable. The threshold number can be any number chosen by a user and operator of the EVDO system. However, one skilled in the art can recognize that the threshold can also be a threshold period of time. In other words, the transmission of a multi-user packet to the group of shared data rate control access terminals at a compatible rate can occur when a threshold period of time is reached, such as an expiration as to when to send the transmission. Further, if the multi-user packet has a set number of available identifications for the shared data rate access terminals this is allowed by the embodiments of the invention.

The access node takes a priority to send multi-user packets over single user packets. The access node will scan the data rate controls which are reported by all of the access terminals currently. Then, the access node can group the access terminals based on similar data rate controls. All of the access terminals in a particular group will have sent the same DRC request. In other words, one group may have access terminals having a shared DRC of seven. Another group of shared access terminals may have sent the same DRC request of eight. Following the identification and/or grouping of the access terminals based on similar DRCs, the access node prepares and transmits multi-user group packets for each group having a single identified DRC. This in itself, will also require the access node to free up MAC IDs for multi-user packets. Since this methodology will result in saving MAC IDs by making multi-user packets a priority.

Figure 3:
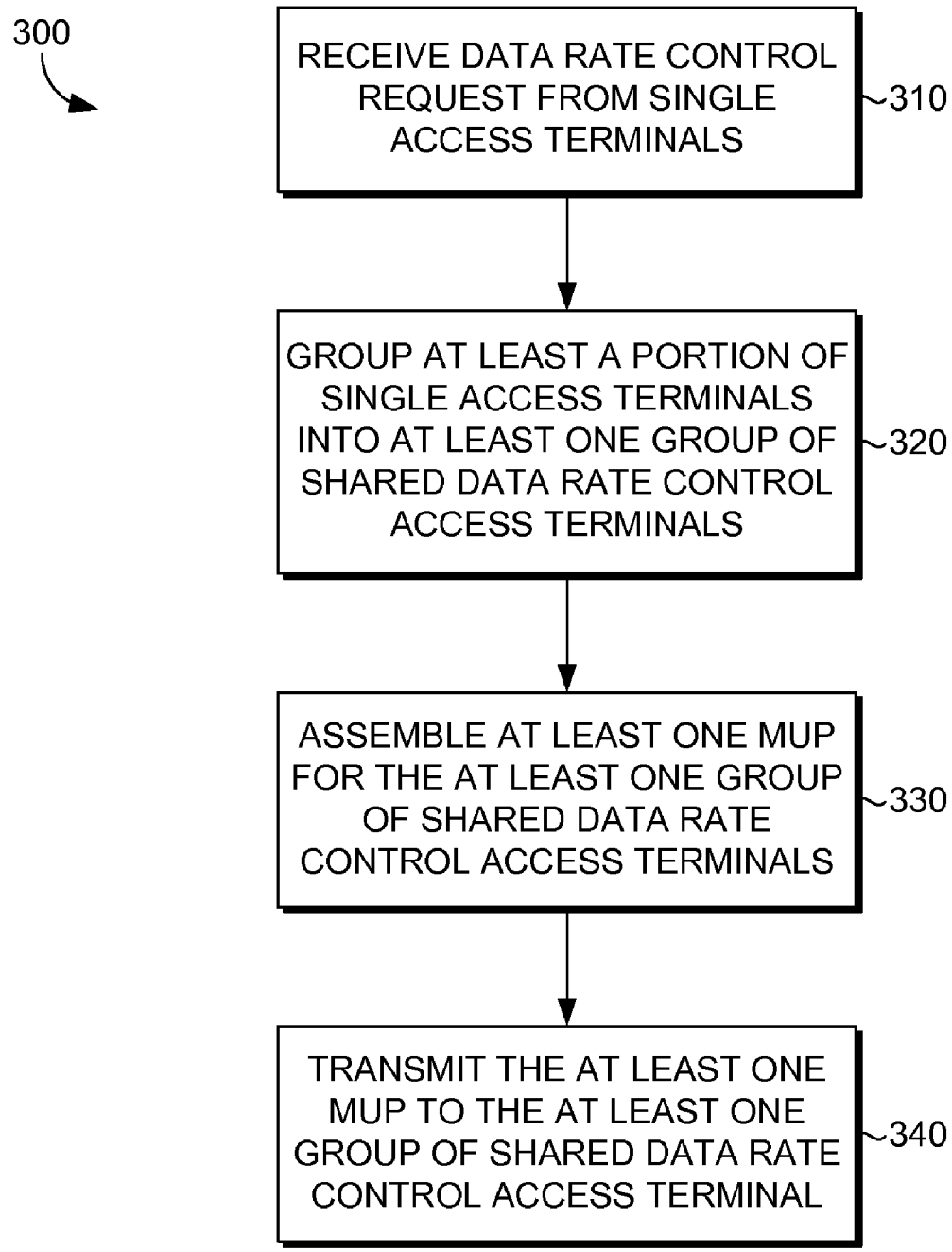
FIG. 3 is a method for sending a multi-user packet to shared data rate control access terminals in accordance with embodiments of the invention.

Now referring to FIG. 3, computer readable media having computer usable instructions embodied thereon are provided. Such media can perform a method of sending a multi-user packet to shared data rate control access terminals. The method 300 begins with a step 310, during which data rate control requests are received from a plurality of single access terminals in an EVDO system. At a step 320, at least a portion of the plurality of single access terminals are grouped to form at least one grouped of shared data rate control access terminals, based on the data rate control request.

At a step 330, at least one multi-user packet is assembled for the at least one group of shared data rate control access terminals. The at least one multi-user packet is transmitted at a step 340 to the at least one group of shared data rate control access terminals. The at least one multi-user packet is sent at a corresponding data rate requested by at least one group of shared data rate control access terminals.

The grouping of at least a portion of the plurality access terminals to at least one group of shared data rate control access terminals is based on a shared data rate identifier. The identifier may take on any number of forms, such as a flag, data in a header, a DRC control, and the like. Furthermore, the grouping of the plurality of access terminals into at least one group of shared data rate control access terminals is based on priority, data rate controlling, and any combination thereof. In other words, the grouping may be based on the identification of the data rate control. However, it may also be based on the priority set by the access terminals. In other words, data rate controls, in some embodiments, can be just one factor for the grouping of the shared data rate control access terminals.

The method 300 may include the determination of the quality of service of an application. In other words, if an application is latency sensitive, it is unlikely that such service will be sent via multi-user packets. Furthermore, large packets that are assembled for multiple users are broken into smaller packets to reduce latency to one single user.

The method 300 in some embodiments include further steps regarding shared data rate control access terminals and single access terminals. If none of the plurality of single access terminals can be grouped into at least one group of shared data rate control access terminals, then the method 300 includes assembling at least one single user packet for at least one of the plurality of single access terminals. Also, the at least one single user packet is transmitted to at least one of the plurality of single access terminals. The at least one single user packet is individually sent at a corresponding data rate requested by the at least one of the plurality of single access terminals.

Transmitting the at least one multi-user packet to the at least one group of shared data rate control access terminals occurs when a threshold number of shared data rate control access terminals within the at least one group of shared data rate control access terminals is reached. Also, the Method 300 allows for a transmission of the at least one multi-user packet to be accomplished upon the expiration of a threshold period of time. One skilled in the art will appreciate that any number of thresholds can be set based on time, number of shared data rate control access terminals, and threshold load on the network.

Figure 4:
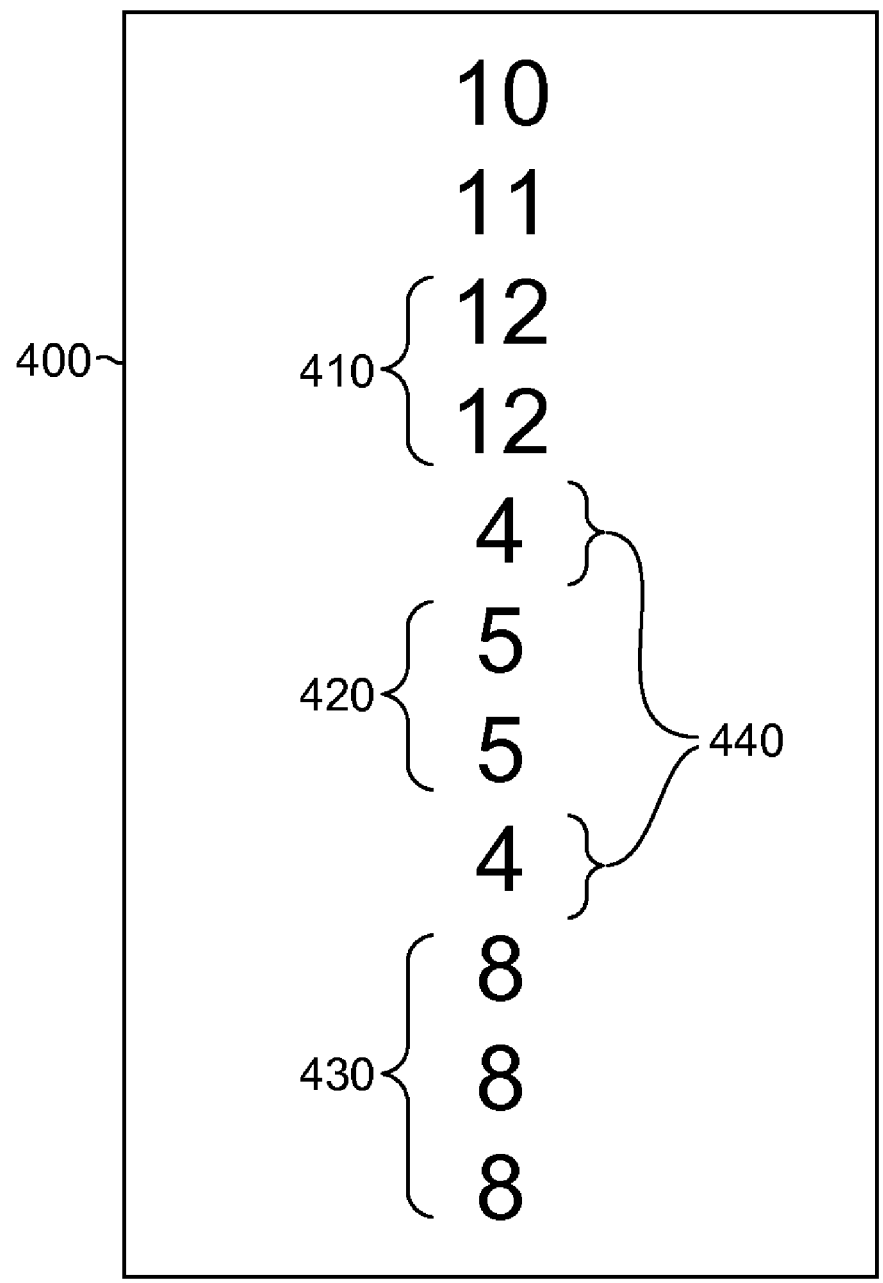
FIG. 4 depicts an exemplary flow of data rate controls being provided from multiple access terminals, and the identification of the groups of shared data rate control access terminals in accordance with embodiments of the invention.

Turning now to FIG. 4, an exemplary identification of DNCs 400 is provided. A listing of DNCs is given starting with a DNC of 10 and ending at the end of the list with a DNC of 8. The listing includes DNCs in the following order: 10, 11, 12, 12, 4, 5, 5, 4, 8, 8, and 8. According to some embodiments of the invention, the identification, grouping, and/or establishment of a plurality of shared data rate control terminals can be shown by the examples given in the listing 400. For instance, the listing 400 includes two instances of DNC at 12. These two instances of DNC 12 will be identified, grouped, or established as a plurality of shared data rate control terminals, as they both share the DNC of 12. The group of DNCs at 12 is shown as a first group of shared data rate control 410. Likewise, a second group of shared data rate control terminals is shown as 420, having two access terminals providing DNCs of 5. Similarly, a third group of shared data rate control terminals is shown as 430, comprising a plurality of shared data rate control terminals having a shared DNC of 8. Finally, a fourth group of shared data rate control terminals is established, identified, or generated based on the shared data rate control of 4 which is presented by two access terminals. Such a fourth group of shared data rate control terminals is shown as the fourth group 440.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for delivering a multi-user packet in an evolution data only (EVDO) system, comprising:
    obtaining data rate control requests from a plurality of access terminals;
    identifying, within a certain period of time, a group of access terminals from the plurality of access terminals, wherein the bandwidth allocation of the group of access terminals does not surpass a threshold bandwidth allocation;
    generating the multi-user packet for the group of access terminals wherein the group of access terminal have an identical data rate control; and
    transmitting the multi-user packet to the group of access terminals at a compatible rate, wherein transmitting the multi-user packet to the group of access terminals at a compatible rate is accomplished at a highest shared data rate control available.

2. The method of claim 1, further comprising:
    identifying a singular data rate control access terminal; and
    transmitting a single user packet to the singular data rate control access terminal.

3. The method of claim 2, wherein transmitting the multi-user packet to the group of access terminals occurs prior to transmitting the single user packet to the singular data rate control access terminal.

4. The method of claim 1, wherein transmitting the multi-user packet to the group of access terminals at a compatible rate is accomplished simultaneously.

5. The method of claim 1, wherein transmitting the multi-user packet to the group of access terminals at a compatible rate occurs when a threshold number of access terminals within the group is reached.

6. The method of claim 5, wherein the threshold number is configurable.

7. One or more non-transitory computer-readable media having computer-useable instructions embodied thereon for performing a method of sending a multi-user packet to shared data rate control access terminals, the method comprising:
    receiving data rate control requests from a plurality of single access terminals in an EVDO system;
    grouping at least a portion of the plurality of single access terminals into at least one group of shared data rate control access terminals, wherein grouping at least a portion of the plurality of access terminals into at least one group of shared data rate control access terminals is based on a shared identical data rate identifier or a shared identical data rate control length;
    assembling at least one multi-user packet for the at least one group of shared data rate control access terminals; and
    transmitting the at least one multi-user packet to the at least one group of shared data rate control access terminals, the at least one multi-user packet being sent at a corresponding data rate requested by the at least one group of shared data rate control access terminals.

8. The computer-readable media of claim 7, further comprising determining a quality of service of an application.

9. The computer-readable media of claim 7, further comprising:
if none of the plurality of single access terminals can be grouped into at least one group of shared data rate control access terminals, then assembling at least one single user packet for at least one of the plurality of single access terminals; and
transmitting the at least one single-user packet to the at least one of the plurality of single access terminals, the at least one single-user packet being individually sent at a corresponding data rate requested by the at least one of the plurality of single access terminals.

10. The computer-readable media of claim 7, wherein transmitting the at least one multi-user packet to the at least one group of shared data rate control access terminals occurs when a threshold number of shared data rate control access terminals within the at least one group of shared data rate control access terminals is reached.

11. A system for transmitting multiple user packets over an EVDO network, comprising:
a plurality of access terminals;
an access node coupled to the plurality of access terminals; and
one or more computer-readable media coupled to the access node, the computer-readable media having computer-useable instructions embodied thereon for performing a method of sending a multi-user packet to shared data rate control access terminals, the method comprising:
receiving data rate control requests from the plurality of access terminals;
grouping at least a portion of the plurality of access terminals into at least one group of shared data rate control access terminals, wherein grouping at least a portion of the plurality of access terminals into at least one group of shared data rate control access terminals occurs until a bandwidth load threshold of the at least one group is reached;
assembling a multi-user packet for each of at least one group of shared data rate control access terminals based on the corresponding data rate control request of the at least one group of shared data rate control access terminals, wherein the group of shared data rate control access terminal have an identical data rate control; and
transmitting the multi-user packet to the at least one group of shared data rate control access terminals, the at least one multi-user packet being transmitted at a highest corresponding data rate requested by the at least one group of shared data rate control access terminals.

12. The system of claim 11, wherein transmitting the multiuser packet to the at least one group of shared data rate control access terminals occurs when a threshold of the at least one group is reached.

13. The system of claim 11, wherein transmitting the multiuser packet to the at least one group of shared data rate control access terminals is one of simultaneous and near-simultaneous.

14. The system of claim 11, wherein the access node is configured to track the at least one group of shared data rate control access terminals, the multiuser packet transmitted to the at least one group of shared data rate control access terminals, and the data rate used by the access node to transmit the multi-user packet.

15. The system of claim 11, wherein the method occurs when a subframe is to be transmitted in the EVDO network.

\* \* \* \* \*